(12) United States Patent
Aberg

(10) Patent No.: US 8,234,625 B2
(45) Date of Patent: *Jul. 31, 2012

(54) OPTIMIZED LOOK-UP TABLE CALCULATIONS IN BLOCK DIAGRAM SOFTWARE

(75) Inventor: Robert O. Aberg, South Grafton, MA (US)

(73) Assignee: The MathWorks, Inc., Natick, MA (US)

( * ) Notice: Subject to any disclaimer, the term of this patent is extended or adjusted under 35 U.S.C. 154(b) by 1172 days.

This patent is subject to a terminal disclaimer.

(21) Appl. No.: 11/880,809

(22) Filed: Jul. 24, 2007

(65) Prior Publication Data

US 2007/0261021 A1    Nov. 8, 2007

Related U.S. Application Data

(63) Continuation of application No. 09/909,931, filed on Jul. 20, 2001, now Pat. No. 7,337,430.

(51) Int. Cl.
*G06F 9/44* (2006.01)

(52) U.S. Cl. ........ 717/109; 717/112; 717/114; 717/117; 700/83; 715/721

(58) Field of Classification Search .......... 717/104–123, 717/129; 700/83; 715/721
See application file for complete search history.

(56) References Cited

U.S. PATENT DOCUMENTS

| | | | |
|---|---|---|---|
| 4,796,179 A | 1/1989 | Lehman et al. | |
| 4,901,221 A * | 2/1990 | Kodosky et al. | 715/771 |
| 5,371,851 A | 12/1994 | Pieper et al. | |
| 5,450,540 A * | 9/1995 | Spohrer et al. | 715/763 |
| 5,481,741 A | 1/1996 | McKaskle et al. | |
| 5,537,630 A * | 7/1996 | Berry et al. | 715/763 |
| 5,612,866 A | 3/1997 | Savanyo et al. | |
| 5,627,979 A | 5/1997 | Chang et al. | |
| 5,696,971 A | 12/1997 | Masih | |
| 5,701,490 A | 12/1997 | Safonov | |
| 5,732,277 A * | 3/1998 | Kodosky et al. | 717/125 |
| 5,913,063 A * | 6/1999 | McGurrin et al. | 717/109 |
| 5,966,532 A | 10/1999 | McDonald et al. | |
| 6,044,219 A | 3/2000 | Lips | |
| 6,061,515 A | 5/2000 | Chang et al. | |
| 6,064,812 A | 5/2000 | Parthasarathy et al. | |
| 6,074,428 A | 6/2000 | Petler | |

(Continued)

OTHER PUBLICATIONS

Dasrath et al., Software & hardware implementation of an OFDM system, Oct. 24, 2000, Internet, p. 1-2.*

(Continued)

*Primary Examiner* — Anna Deng
*Assistant Examiner* — Satish Rampuria
(74) *Attorney, Agent, or Firm* — Nelson Mullins Riley & Scarborough LLP

(57) ABSTRACT

Pre-lookup index search blocks and multidimensional interpolation blocks that use the results of the pre-lookup index search blocks in a block diagram to graphically specify (and perform) multidimensional interpolation calculations. The pre-lookup index search and interpolation blocks are defined so as to provide for a separation of breakpoint set data and table data, thus enabling a user to explicitly manage the use of common breakpoint set data. A block diagram created using pre-lookup index search blocks and interpolation using pre-lookup index search blocks shows all tables that use a particular breakpoint set via graphical connections on the block diagram between the pre-lookup index search blocks and the interpolation using pre-lookup index search blocks.

19 Claims, 10 Drawing Sheets

U.S. PATENT DOCUMENTS

| | | | |
|---|---|---|---|
| 6,138,270 | A | 10/2000 | Hsu |
| 6,173,208 | B1 | 1/2001 | Park et al. |
| 6,185,728 | B1 | 2/2001 | Hejlsberg |
| 6,233,703 | B1 | 5/2001 | Powers |
| 6,269,474 | B1 | 7/2001 | Price |
| 6,366,300 | B1 | 4/2002 | Ohara et al. |
| 6,404,923 | B1 | 6/2002 | Chaddha |
| 6,501,470 | B1 | 12/2002 | Miura |
| 6,588,004 | B1 | 7/2003 | Southgate et al. |
| 6,629,099 | B2 | 9/2003 | Cheng |
| 6,691,301 | B2 | 2/2004 | Bowen |
| 6,718,535 | B1 | 4/2004 | Underwood |
| 2003/0018953 | A1 | 1/2003 | Aberg |
| 2003/0051226 | A1 | 3/2003 | Zimmer et al. |
| 2003/0120711 | A1 | 6/2003 | Katz |
| 2004/0015823 | A1 | 1/2004 | Nolan |

OTHER PUBLICATIONS

Bekeley design technology, Choosing block-diagram tools fo rDSP design, Apr. 1995, Internet, p. 1-5.*

Berkeley Design Technology, Inc., "Choosing Block-Diagram Tools for DSP Design," retrieved online at http://www.bdti.com/articles/info_dspmt95blockdiagram.htm (1995).

Catunda, Sebastian Y.C. et al., "Optimized Look-up Table for Inter-Mesurand Compensation," *IEEE Instrumentation and Measurement Technology Conference*, vol. 1:128-132 (2001).

Chang, Chin-Chen et al., "An Efficient Computation of Euclidean Distances Using Approximated Look-Up Table," *IEEE Transactions on Circuits and Systems for Video Technology*, vol. 10(4):594-599 (2000).

Dasrath, Surujlal et al., "Software & Hardware Implementation of an OFDM System," retrieved online at http://cegt201.bradley.edu/projects/proj2001/ofdmprjt/system_block.html (2000).

Edamatsu, Hisakazu et al., "Pre-layout delay calculation specification for CMOS ASIC Libraries," *Proceedings of the ASP-DAC '98 Design Automation Conference*, pp. 241-248 (1998).

Shima, Takeshi et al., "Table Look-Up MOSFET Modeling System Using a 2-D Device Simulator and Monotonic Piecewise Cubic Interpolation," *IEEE Transactions on Computer-Aided Design of Integrated Circuits and Systems*, vol. CAD-2(2):121-126 (1983).

\* cited by examiner

OPTIMIZED LOOK-UP TABLE CALCULATIONS IN BLOCK DIAGRAM SOFTWARE

RELATED APPLICATION

This application is a continuation of U.S. patent application Ser. No. 09/909,931, filed Jul. 20, 2001, the entire content of which is incorporated by reference herein.

RELATED FIELD

The illustrative embodiment of the present invention relates generally to graphical block diagram modeling.

BACKGROUND

Dynamic systems may be modeled, simulated and analyzed on a computer system using graphical block diagram modeling. Graphical block diagram modeling graphically depicts mathematical relationships among a system's inputs, states and outputs, typically for display on a graphical user interface.

In the context of graphical block diagram modeling, blocks are graphical structures that have a defined functionality. Such blocks may be placed in a reference library to define a graphical class. Graphical libraries are similar to system software libraries in that they are a repository of classes. These classes, or more specifically, graphical classes, can be used by multiple users to build custom systems. When a graphical class is used in a model, it is said to be instantiated, i.e., an instance of the graphical class is created for use in the model. Such an instance can also be referred to as a link to the graphical class that resides in the library. Parameters are class member data that are specified when a user constructs a new instance of a class. Instances associated with the class have parameter specification interfaces that allow a user to define these "top-level" parameters. On a graphical user interface (or "GUI"), such parameter specification interfaces take the form of a dialog box with various parameter entry fields. A user can therefore change the top-level parameters of an instance by changing parameter data in a parameter field in the dialog box for that instance.

Prior graphical block-diagram based tools for modeling and simulating dynamic systems include Simulink® from The Math Works Inc. One type of block supported by such tools is an n-dimensional interpolation block that performs an index search operation and interpolated table lookup. Multiple interpolation blocks with common input signals and breakpoint data sets have to perform identical index search operations.

SUMMARY

In one aspect, the invention provides methods and apparatus, including computer program products, for block diagram modeling. The methods include a method of block diagram modeling in a data processing system. The method includes: in a first block, receiving a first value indicative of an index into a lookup table; in the first block, generating information indicative of the location of the first value relative to a pre-defined domain of possible indexed values; in a second block, receiving the information generated by the first block; and using the information received in the second block to determine an output value of a first lookup table.

Particular implementations of the invention may provide one or more of the following advantages.

Unlike prior graphical block diagram approaches, which for multiple table look-up blocks with common input signals and breakpoint data sets repeat identical index search operations for each input value and breakpoint data set specified by a user, the graphical block diagram technique of the present invention allows the result of each index search block calculation to be re-used by every interpolation block semantically connected to that pre-lookup block's outputs. Additionally, in the case of multi-dimensional table interpolations, the pre-lookup index search block reduces the specification of the index search parameters or each breakpoint data set. Thus, the technique provides for a more efficient multidimensional interpolation, as it does not require repeating calculations and allows centralized specification of index search parameters.

Other features and advantages of the invention will be apparent from the following detailed description and from the claims.

DESCRIPTION OF DRAWINGS

FIG. 1B in particular shows four 2-dimensional interpolation blocks that share common input signals and breakpoint sets for the respective input signals.

Like reference numbers will be used to represent like elements.

DETAILED DESCRIPTION

Figure 1A:
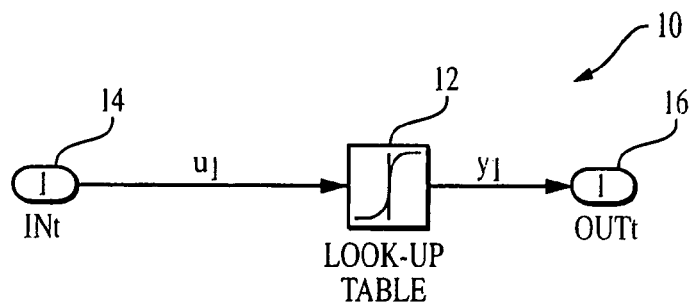
FIGS. 1A and 1B are prior art, graphical block diagramming software generated block diagrams that include look-up blocks for 1-dimensional and 2-dimensional interpolation, respectively.
Figure 1B:
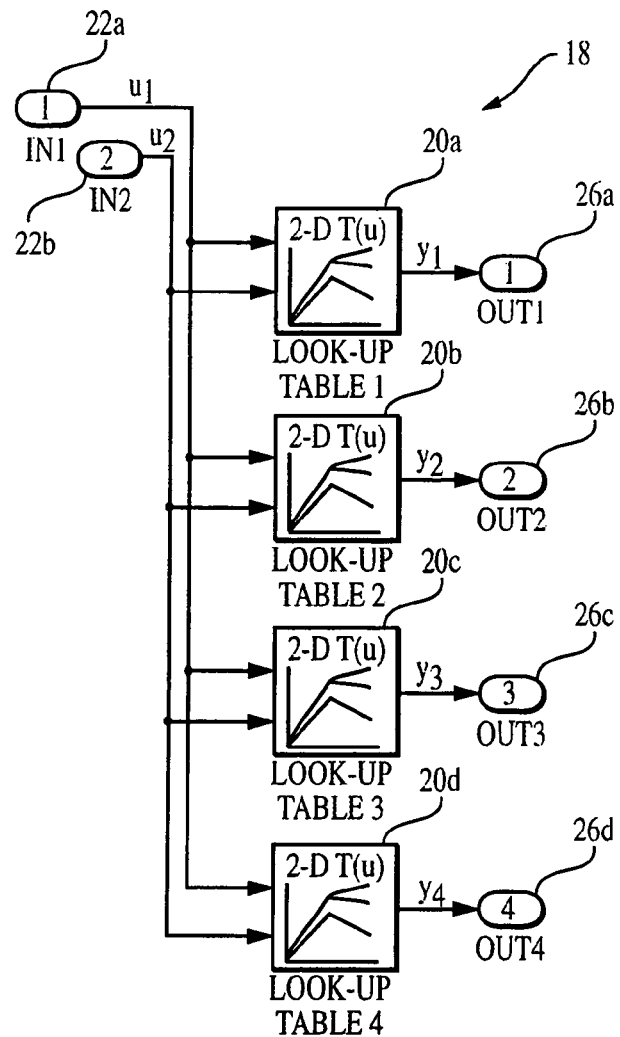

FIGS. 1A and 1B illustrate conventional interpolation table lookup in the form of a graphical block diagram. Referring to FIG. 1A, a first block diagram 10 includes a one-dimensional interpolation lookup block 12 which receives an input value ("ui") from a single input port ("In1") 14 and provides an output value ("yi") to a single output port ("Out1") 16. Referring to FIG. 1B, a second block diagram 18 includes four two-dimensional interpolation lookup blocks 20a, 20b, 20c and 20d. Each of the blocks 20 receives a first input value ("uj") from a first input port ("In1") 22 and a second input value ("U2") from a second input port ("In2") 24, and provides an output value to a corresponding output port ("Out1") 26a, ("Out2") 26b, ("Out3") 26c, ("Out4") 26d, respectively.

The manner in which the blocks 12, 20 are defined and executed to perform an index search operation and interpolated table lookup is known in the art. The lookup table blocks 12, 20 implement an array of table data and map the table data to a domain of indexed values ("breakpoints"), which is typically a non-repeating, monotonically increasing set of values. The breakpoints are the values at which the relationship which the table has sampled is evaluated for a given index. The breakpoints define intervals or segments in which the input value(s) may fall. The blocks determine the location of the input value relative to one of the intervals and use that location to interpolate between table data values. It will be appreciated that, in a multi-dimensional configuration such as that shown in FIG. 1B, each of the blocks 20 has to perform its own index search operation for the same set of input values and the same breakpoint sets.

Figure 2:
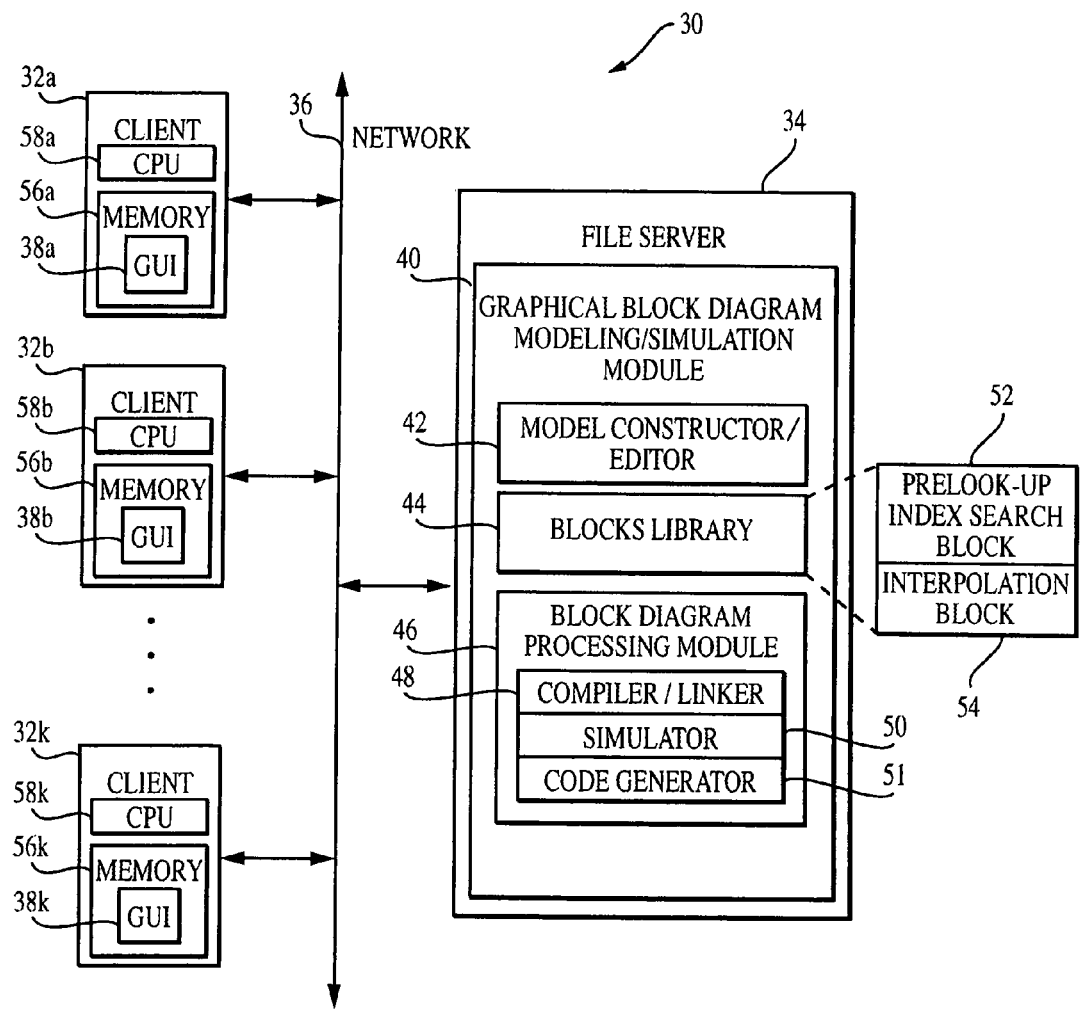
FIG. 2 is a block diagram of a system that includes a file server that stores a graphical block diagramming module that includes model editor, simulator and software code generation processes that support pre-lookup index search blocks and interpolation (using pre-lookup index search) blocks, and user systems that access the file server and execute the processes of the graphical block diagram modeling/simulation module for graphical block diagram model development and execution.

Referring to FIG. 2, a system 30 includes client systems 32a, 32b, ..., 32k and a file server 34 each connected to a network 36, e.g., an Ethernet network, the Internet, or other type of network. Alternatively, instead of being connected to a network, the systems 32 and 34 could be interconnected by a system bus such as Fibre Channel. Each of the client systems 32a, 32b, ..., 32k includes a graphical user interface (GUI) 38a, 38b, ..., 38k. The file server 34 is configured with a graphical block diagram modeling and simulation module 40 (hereinafter, simply, "the module"), which is implemented in software. The module 40 includes a model constructor/editor 42, as will be described later. The module further includes a blocks library 44 and a block diagram processing engine 46. As will be explained more fully below, the model editor 42, in conjunction with the library 44, is used by a client system user to construct and display a graphical block diagram model which visually and pictorially represents a dynamic system of interest to that user. The block diagram processing engine 46 includes a compiler/linker 48 to interpret the block diagram generated by the model editor 42, a simulator 50 that executes the interpreted block diagram to produce simulation results and a code generator 51 that converts the interpreted block diagram to executable code (e.g., textual source code, such as C, or firmware source code for execution on an embedded processor), or transmits signals that configures or can be used to configure a hardware device, for example, a field programmable gate array.

The block library 44 serves a repository for blocks, including a pre-lookup index search block 52 which performs an index search operation and an "interpolation using pre-lookup index search" block (hereafter, simply, "interpolation block") 54, which uses the output of the pre-lookup index search block 52 to perform an interpolated lookup, as will be described.

The system 30 illustrates a remote client access configuration in which the module 40 is installed on a central file server, i.e., the file server 34, and users of the client systems 32 access the module 40 over the network 32. In an alternative configuration, e.g., in an environment in which access to the library 44 is not shared by multiple users, the module 40 could be installed on a single stand-alone or networked computer system for local user access.

Each of the client systems 32a, 32b, ..., 32k, includes a respective memory 56a, 56b, ..., 56k, for storing all or accessed portions of the module 20, as well as a respective CPU 58a, 58b, ..., 58k for executing the stored portions of the module 40, the GUI 38 and other OS programs (not shown) for controlling system hardware. Although not shown, it will be understood that the systems 32 and 34 can be, in other respects, of a conventional design and architecture. That is, the systems 32 include conventional system I/O peripherals, e.g., display, mouse, keyboard and the like, for enabling user interaction with the system. The file server 34 includes conventional server software and hardware, and thus includes the appropriate storage for storing the software programs of the module 40, along with OS and server application programs, and CPU for executing those programs.

For illustrative purposes, the module 40 will be described within the context of a Simulink® and MATLAB® based simulation environment. Simulink® and MATLAB® are commercial software products available from The Math Works, Inc. The Simulink® software package includes a number of different tools, such as special user interfaces and navigational tools, e.g., a library browser, which will be referenced in the description to follow. Further details of these tools and interfaces can be had with reference to available Simulink® and MATLAB® product documentation. It will be understood, however, that other block diagram based modeling software platforms could be used.

The term "graphical block diagram" refers to a set of graphical blocks (or nodes) and a set of lines (or signals) that carry data between the graphical blocks. Each graphical block typically performs a function and that function (or equation) is a sub-component of an overall set of equations describing a dynamic system. The function may be mathematical in nature or it may be an operation such as reading data from a hardware device. The graphical blocks may be parameterized with user-defined values, as will be described.

Using the functions or equations defined by each of the blocks, the graphical block diagrams can be executed to produce simulation results and generate textual software or firmware source code automatically as defined by the graphical blocks and signals in a model. Each of the equations is defined in a corresponding method (code module). For example, an output method, when invoked by the simulator 50 during model execution, determines an output signal y based on a given input signal u and block parameter value(s) p.

The module 40 enables users to copy graphical blocks into their models from the libraries 44 (or, optionally, from external libraries). Alternatively, or in addition, the module 40 allows a user to implement a custom block for use in a model and to add that custom block to the library 44 if the user so chooses. In a Simulink® product context, such custom blocks are referred to as "S-function" blocks.

Figure 3A:
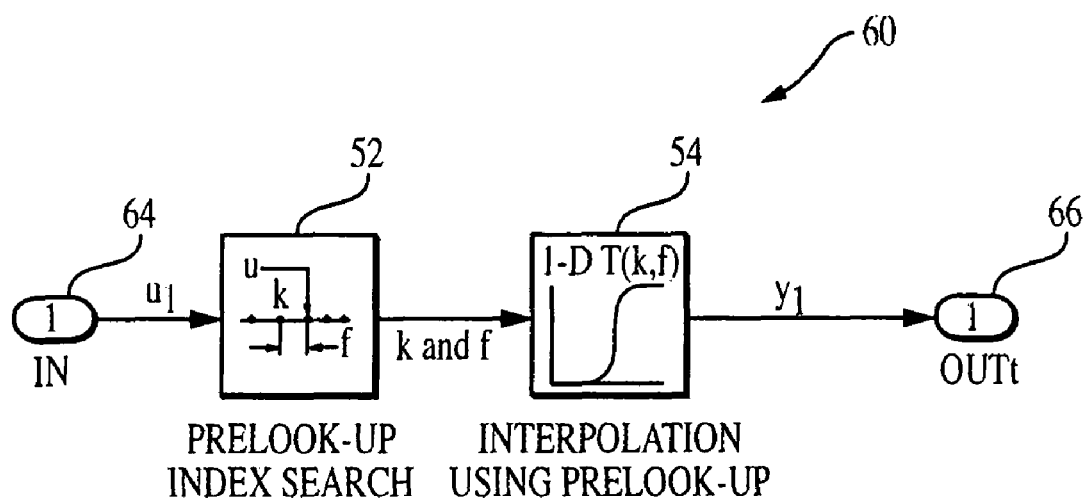
FIGS. 3A-B are exemplary 1-dimensional and 2 dimensional depictions, respectively, of a block diagram that employs the pre-lookup index search block and interpolation (using pre-lookup index search) block of FIG. 2.
Figure 3B:
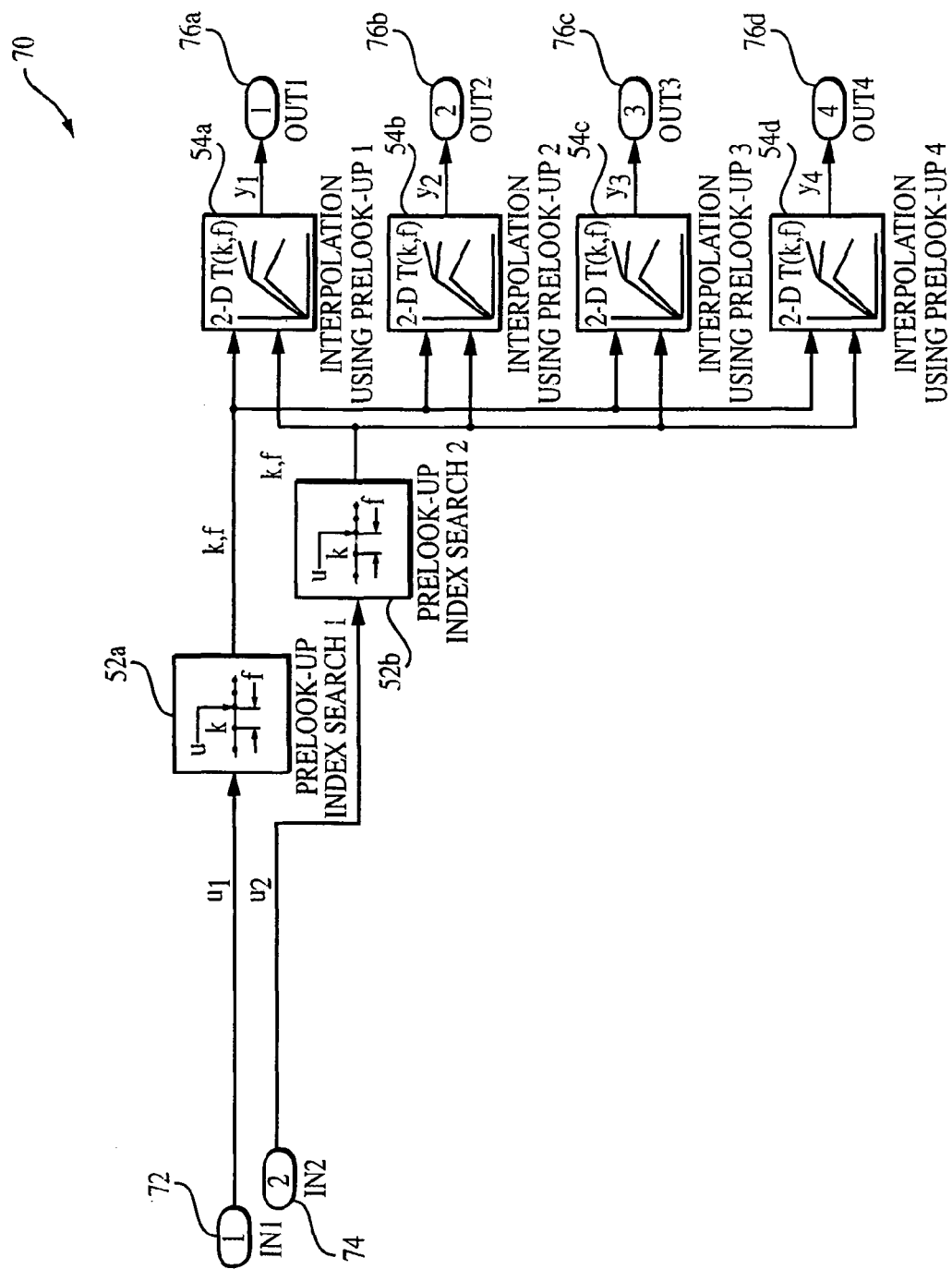

FIGS. 3A-B illustrate examples of block diagrams created by the module 40. The block diagrams of FIGS. 3A and 3B implement the same functionality as the blocks diagrams depicted in FIGS. 1A and 1B, respectively, but use the blocks 52, 54 (from FIG. 2), collectively, to provide interpolation functionality in a more efficient manner, when the breakpoints of tables 20 are in common for the first input ports and the breakpoint sets for the second input ports are also in common with each other.

Referring to FIG. 3A, a first block diagram 60 includes the pre-lookup index search block 52. The block 52 receives an input value ("ui") from a single input port ("In1") 64 and provides output values ("k" and "f", as later defined) to the interpolation block 54, which in turn provides an output value ("yi") to an output port ("Out1") 66. Referring to FIG. 3B, a second block diagram 70 includes two of the pre-lookup index search blocks 52, indicated as 52a and 52b, and four of the interpolation blocks 54, indicated as 54a, 54b, 54c, 54d. The block 52a receives a first input value ("ui") from a first input port ("In1") 72a and provides outputs k and f to each of the blocks 54a-54d. The block 52b receives a second input value ("112") from a second input port ("In2") 72b, and provides outputs k, f, distinct from the k, f of block 52a, to each of the blocks 54a-54d. Each of the blocks 54a-54d provides a corresponding output y, indicated as y1, y2, y3, y4, respectively, to respective, corresponding output ports ("Out1") 76a, ("Out2") 76b, ("Out3") 76c, ("Out4") 76d, respectively. The blocks 52 and 54 can be implemented to perform any type of index search operation and interpolation (including extrapolation) algorithm, respectively.

For explicit pre-lookup index search and interpolation using pre-lookup block diagram constructs, the inputs to the module 40 include the following: i) input values (or table input values), connected graphically to input ports of the pre-lookup blocks 52; ii) breakpoint data set values for the pre-lookup blocks 52; and iii) table data values for the interpolation blocks 54. The module 40 enables a user to construct a block diagram to graphically connect the table input values to the pre-lookup index search blocks 52, which in turn are semantically connected to the interpolation blocks 54. Typically, to be useful, the outputs of the interpolation blocks 54 are graphically connected to other blocks in the block diagram so that the result of the interpolation calculation is used.

The operation of the models in FIGS. 3A and 3B will now be described in more detail. Each pre-lookup index search block 52, which performs an index search operation, has associated with it a "breakpoint data array", an ordered list of values of length N, $\{bp(0), bp(1), \ldots, bp(N-1)\}$. These breakpoint values define a set of regions that include regions corresponding to a set of N−1 intervals as well as regions below the first and above the last interval. Each block 52 uses its input value to compute as its outputs the numbers "k" and "f", as shown in FIGS. 3A and 3B. The number "k" is an interval index integer and the number "f" is a distance fraction "f". The value of "k" specifies in which region the input value resides. The block performs an index search to determine the value of k. Using a linear index search, the blocks determines k for an input value by checking each consecutive interval i, where i=0, 1, 2 . . . , N−1, to determine if the input value resides in that interval. That is, for an input value "u", the block determines if $bp(0) < u < bp(1)$ for a first interval (i=0), $bp(1) < u < bp(2)$ for a second interval (i=1), and so forth, that is, testing each consecutive interval i from 0 through i=N−1, until the block finds an inequality for a given interval to be true. The value i for the interval for which the inequality is determined to be true is the value k. Although a linear search algorithm has been described, any type of index search algorithm can be used to determine the value of k. For input values that are within the first through the last interval in the breakpoint data, the value of f specifies the normalized distance on the interval specified by k (that is, 0.0<f<1.0). If an input value falls within regions outside of the first through the next-to-last intervals, then an extrapolation is performed and the distance fraction for the extrapolation is:

$$u < bp(0): k=0; f=(u-bp(0))/(bp(1)-bp(0)) \qquad \text{Eq. 1}$$

$$u >= bp(N-1): k=N-2; f=(u-bp(N-2))/(bp(N-1)-bp(N-2)) \qquad \text{Eq. 2}$$

Thus, the pre-lookup index search block locates an input value's relative position within a range of numbers (that is, the breakpoints in the breakpoint data set) and returns an array of the interval index "k" and distance fraction "f" that the input value reaches into the $k^{th}$ interval. The pre-lookup index search results (k, f) are in turn inputs to one or more ports on the interpolation blocks 54, which perform the desired interpolation.

For example, and as illustrated in FIG. 3A, a 1-Dimensional (1-D) linear interpolation y, using pre-lookup block output (k, f) and N Table values $\{T(0), T(1), \ldots, T(N-1)\}$ corresponding to the breakpoint data set $\{bp(0), bp(1), \ldots, bp(N-1)\}$ is:

$$y=T(k)+f*(T(k+1)-T(k)) \qquad \text{Eq. 3}$$

The interpolation calculation of Eq. 3 is well known among table look-up programmers and is also used in prior art look-up block implementations.

Therefore, in its most basic form, the module 40 uses the pre-lookup and interpolation blocks 52, 54 to split the operation of a conventional one-dimensional table look-up (one input value and one output value) into the index search portion and the interpolation portion of the calculation, as shown in FIG. 3A. Referring back to FIG. 1A, the block 12 performs the calculation for the index search and the interpolation internally.

For a multi-dimensional example, FIG. 1B shows a traditional lookup that perform 8 index searches and 4 interpolations, while FIG. 3B shows an equivalent construct that performs 2 index searches and 4 interpolations.

Figure 4:
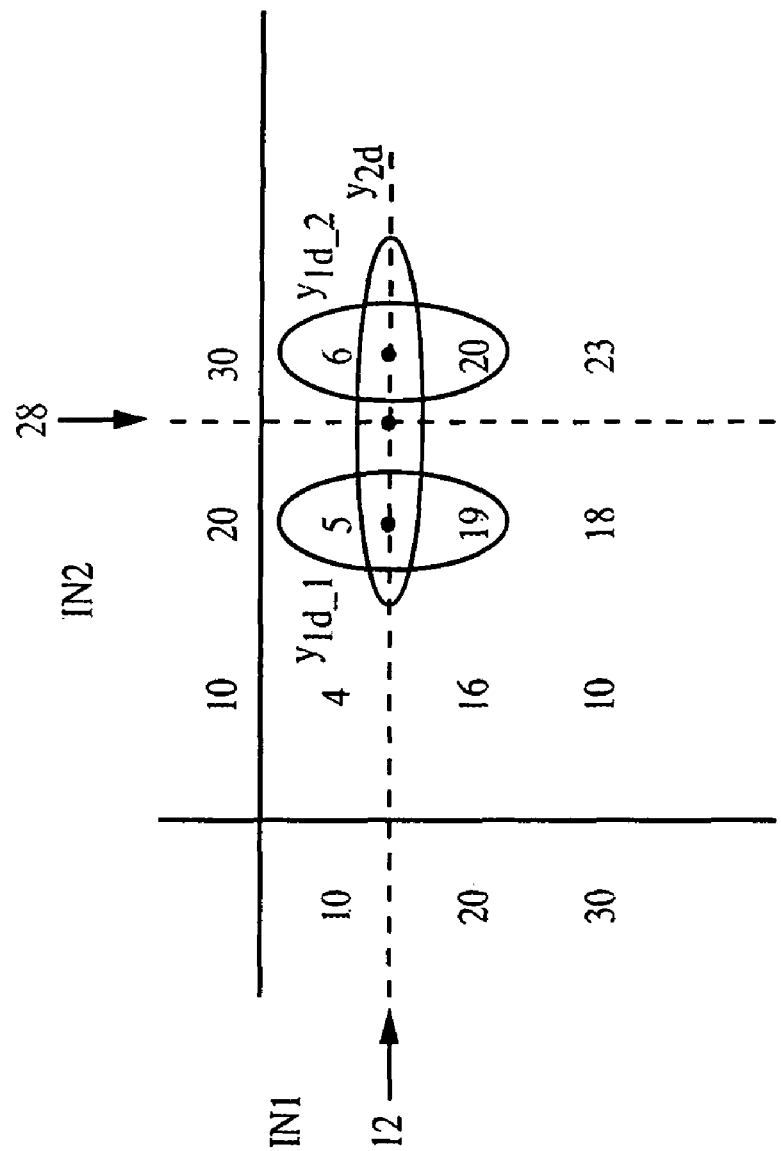
FIG. 4 is an exemplary table for 2-dimensional index search and interpolated lookup.

Referring to FIG. 4, assume that the data used the two-dimensional example shown in FIG. 3B is as follows:
Breakpoints for $1^{st}$ dimension: [10, 20, 20]
Breakpoints for $2^{nd}$ dimension: [10, 20, 30]
Table data for all tables: [4 5 6; 16 19 20; 10 18 23] (semicolon indicates end of row)

For simplicity of the example, the table data is all the same, but it could just as easily be different for each table with no impact on the number of operations used in the interpolation step. Likewise, the breakpoint data sets for the different dimensions need not be the same. Further assume that the input value ui of input port In1 is 12 and the input value U2 of input port In2 is 28. The index search operation for the $1^{st}$ dimension ("search 1") uses ui and the $1^{st}$ dimension breakpoints to determine search 1 outputs (k, f). The index search operation for the $2^{nd}$ dimension (search 2) uses U2 and the $2^{nd}$ dimension breakpoints to determine search 2 results (k, f). For search 1, the value of index "k" is 0. That is, the input value 12 resides in interval 0 (10 to 20). For search 2, the value of index "k" is 1, as the input value 28 resides in interval 1 (20 to 30). The distance fraction "f" for each of the two dimensions is as follows:
$1^{st}$ Dimension:
Distance fraction (f), Interval 0=[(12−10)/20−10)]=0.2
$2^{nd}$ Dimension:
Distance fraction (f), Interval 1=[(28−20)/(30−20)]=0.8
Thus, the output of the pre-lookup index search block 52a (search 1) is (0, 0.2). The output of the pre-lookup index search block 52b (search 2) is (1, 0.8).

The interpolation calculations performed by each of the interpolation blocks 54a-54d are as follows:

1$^{st}$ Dimension:

$y_{1d1}$=5+0.2(19−5)=7.8

$y_{1d\_2}$=6+0.2(20−6)=8.8

2$^{nd}$ Dimension:

$y_{2d}$=7.8+0.8(8.8−7.8)=8.6

Therefore, in the example of FIG. 3B, the value of each of the outputs $y_1$, $y_2$, $y_3$, $y_4$ of the interpolation blocks 54a, 54b, 54c, 54d, respectively, is 8.6

In the described embodiment, and as noted earlier, the blocks 52, 54 reside in the library 44 and so can be used by multiple users in their respective models. A user selects the blocks using a menu provided by a library browser. Having opened a model window for a model to be generated and/or edited, the user copies the selected blocks from the library window to the model window, e.g., by selecting ("clicking on") a corresponding library node or icon, dragging the block from the library browser and dropping it in the model window.

Figure 5:
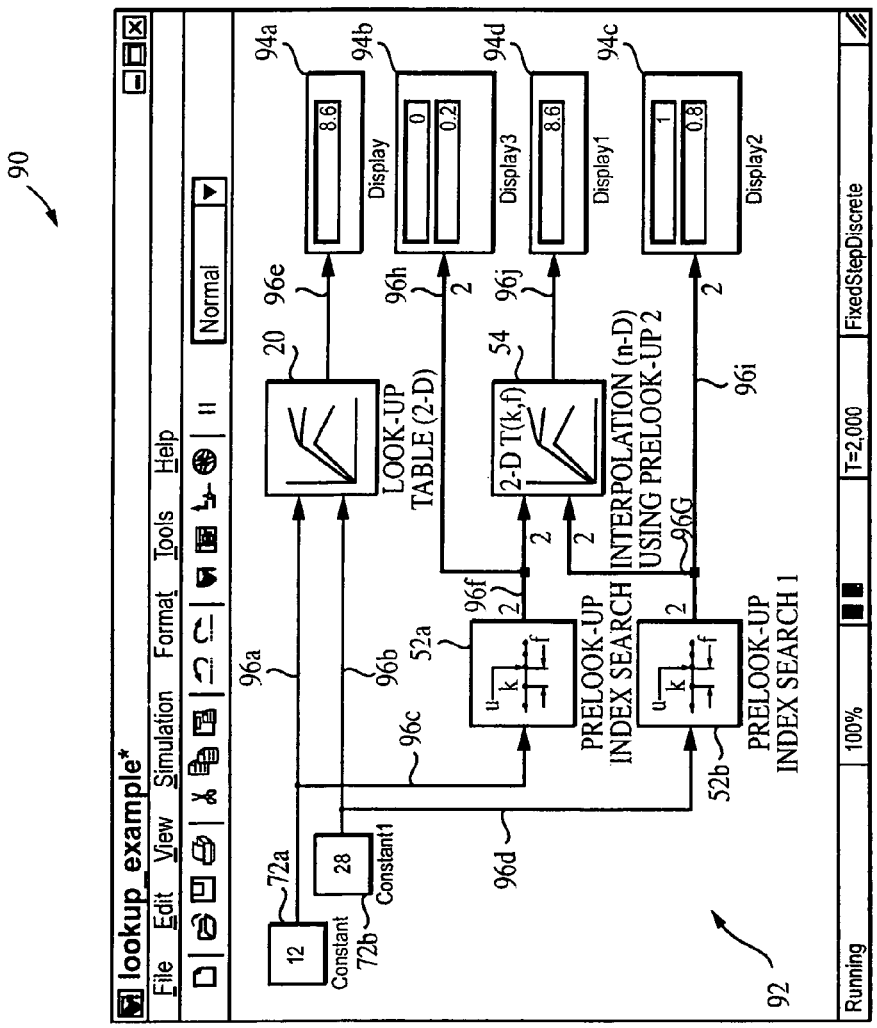
FIG. 5 is an exemplary screen display from a GUI of a client system executing the model editor of the graphical block diagram modeling/simulation module (of FIG. 1) during graphical block diagram model development, illustrating the use of the conventional interpolation look-up block (of FIG. 1B) along side the use of the pre-lookup index search blocks and interpolation (using pre-lookup index search) block.

Referring now to FIG. 5, a screen display of a model window 90 shows the placement of the selected blocks 52a, 52b and 54 within a user's model 92. In the exemplary block diagram model 92 shown, the user has also included the constant ports or blocks 72a, 72b to supply the table input values. In keeping with the previous example, these values are 12 and 28. Only one of the four blocks 54 in the previous example is shown in the model window. To further illustrate the differences between the conventional lookup block 20 (from FIG. 1B) and the new blocks 52a, 52b and 54, as well as to highlight the fact that the module 40 can (optionally) support the conventional style lookup block 20 as well, the model 92 also includes the lookup block 20.

Further included in the model 82 are display blocks 94a, 94b, 94c and 94d for displaying the outputs of the blocks 20, 52a, 52b and 54, respectively. The model 92 also includes connection lines 96a-96j. Lines 96a and 96b connect the constant 72a and the constant 72b, respectively, to the lookup block 20, which is connected to the display 94a by the line 96e. Lines 96c and 96d connect the constant 72a and the constant 72b to the pre-lookup blocks 52a, 52b, respectively. The block 52a is connected to the display 94b by the line 96h and to the interpolation block 54 by the line 96f. The block 52b is connected to the display 94c by the line 96i and to the interpolation block 54 by the line 96g. The block 54 is connected to the display 94d by the line 96j. During model execution, as shown, the displays 94a through 94d display the appropriate output values for the blocks to which they are connected, given the same data values used in the example described earlier.

The behavior of a block in a block library may be defined in terms of "top level" parameters that the user may specify when creating an instance of the block. The behavior of the block is akin to the behavior of a template class as used in object oriented programming languages such as C++. Instances associated with the graphical class in the library 44 have parameter specification interfaces that allow a user to set values for these "top-level" parameters. On the user's GUI, such as the GUI 18 (of FIG. 2), such parameter specification interfaces take the form of a dialog box with various parameter fields. A user can therefore change the top-level parameters of an instance by changing parameter data in a parameter field in the dialog box for that instance. Alternatively, a user could specify the parameters programmatically via a textual API.

Figure 6:
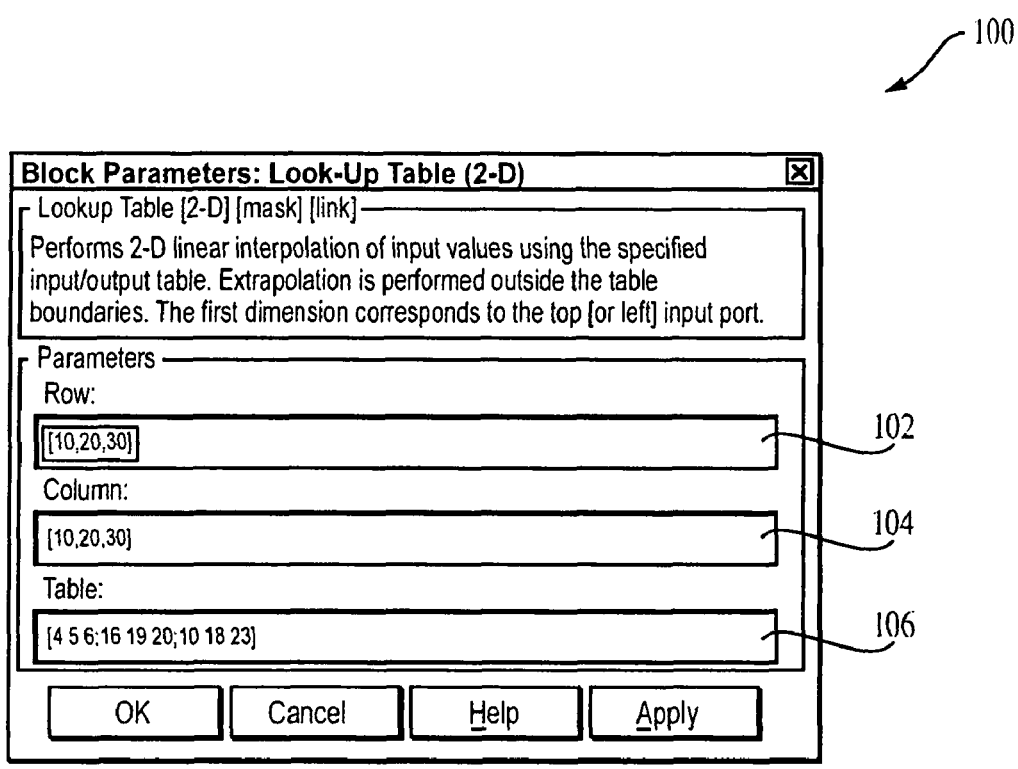
FIG. 6 is an exemplary GUI screen display of a dialog box for specifying block parameters for the conventional interpolation look-up block shown in FIG. 5.

Referring to FIG. 6, a parameters dialog box 100 for the (prior art) interpolation lookup block 20 is shown. The user uses parameter fields 102, 104 and 106 to set respective parameter values, or, more specifically, 1$^{st}$ dimension (row) break point data set values 102, 2$^{nd}$ dimension (column) break point data set values 104, and table data 106, respectively.

Figure 7A:
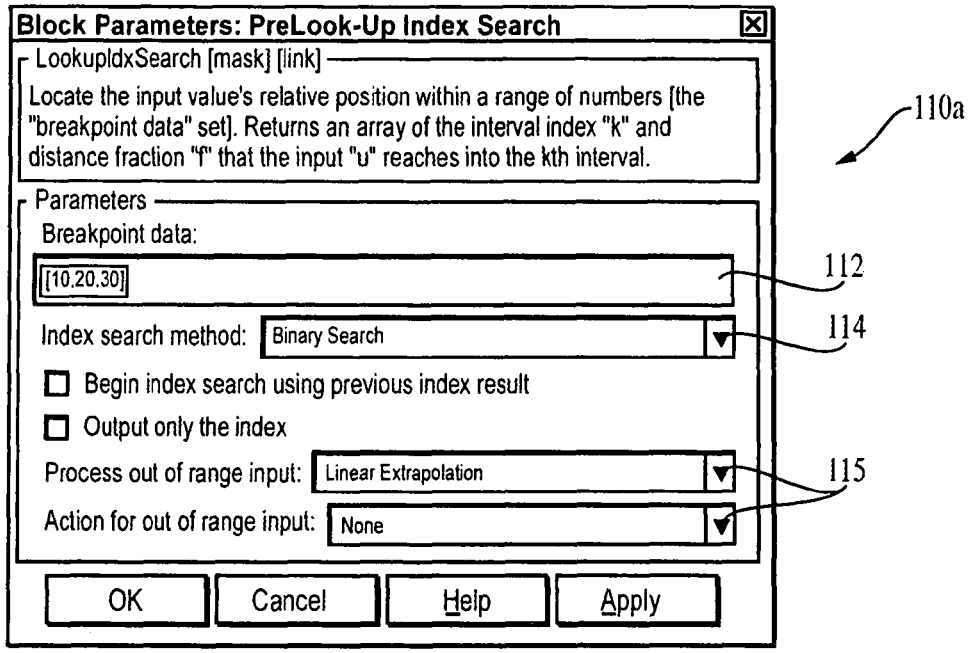
FIGS. 7A and 7B are exemplary GUI screen displays of respective dialog boxes for specifying block parameters for the pre-lookup index search blocks shown in FIG. 5.
Figure 7B:
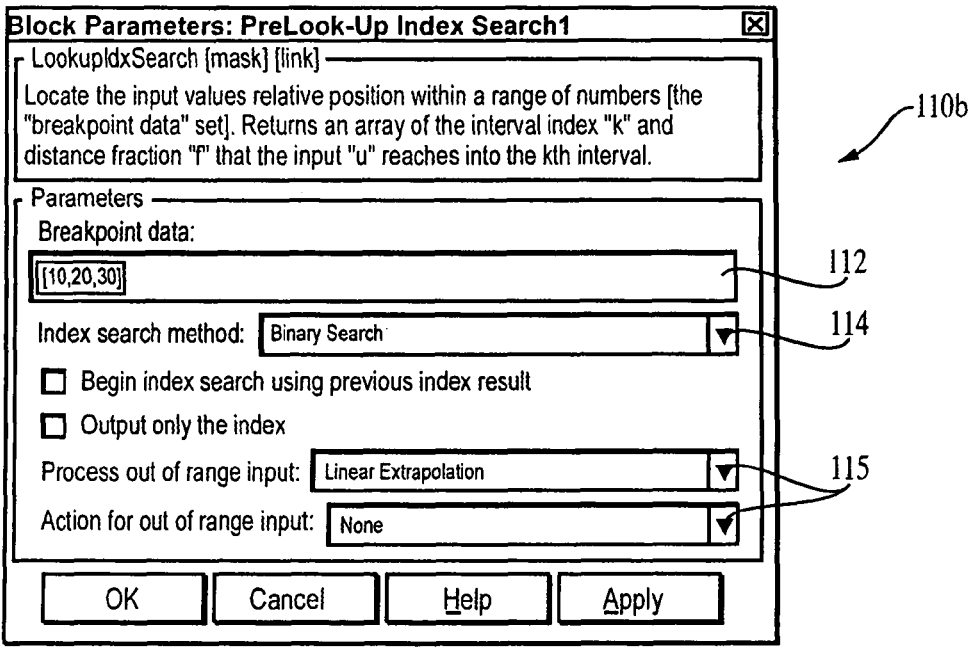

FIGS. 7A and 7B illustrate dialog boxes 110a and 110b for the blocks 52a and 52b, respectively. Each of the boxes 110 includes a parameter field 112 for specifying the breakpoint data array for the search/dimension to which the block corresponds. The field 112 in the box 110a specifies the row breakpoint data for block 52a and the field 112 in the box 110b specifies the column breakpoint data for block 52b. The boxes 110 further include a field 114 for specifying an index search algorithm, e.g., linear search, to be used, as well as fields 115 for specifying extrapolation information for handling cases in which the input values fall outside the breakpoint data defined intervals as described earlier.

Figure 8:
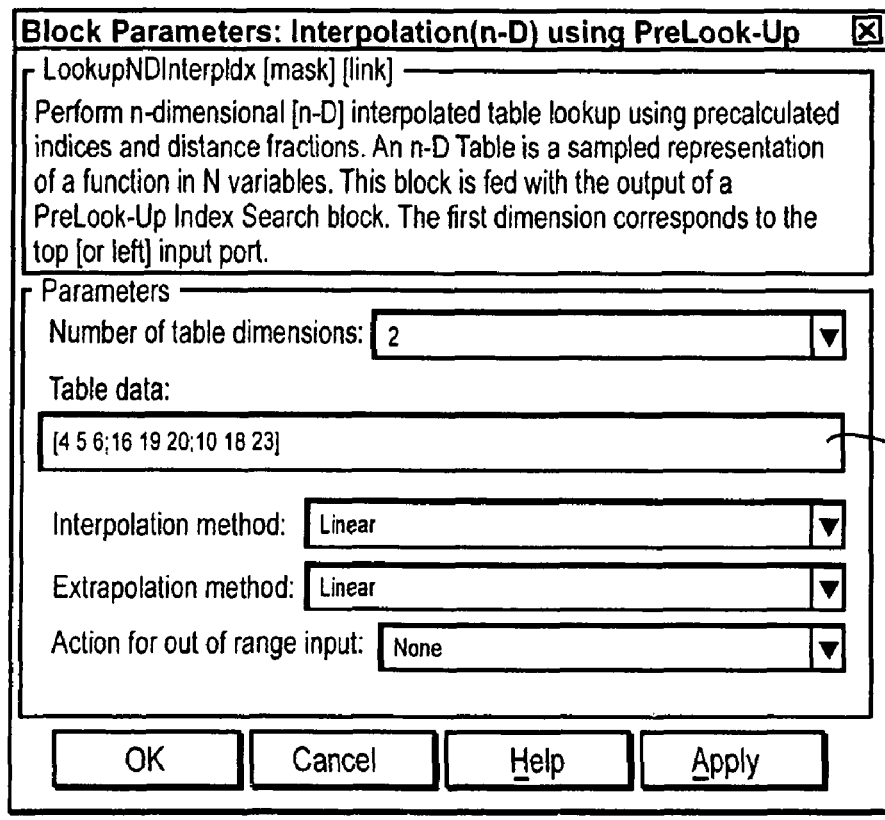
FIG. 8 is an exemplary GUI screen display of a dialog box for specifying block parameters for the interpolation (using pre-lookup index search) block shown in FIG. 5.

Referring to FIG. 8, a parameters dialog box 116 for the interpolation block 54 is shown. It includes a table data field 118 for specifying the table data.

Figure 9:
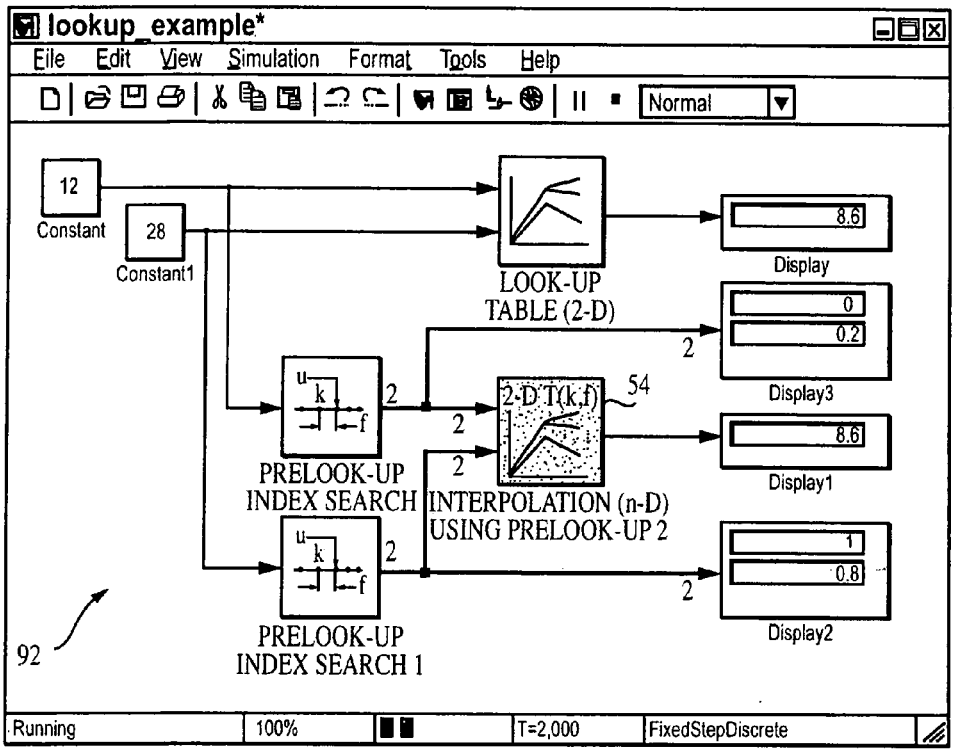
FIG. 9 is another view of the GUI screen display of the block diagram of FIG. 5 showing the selection of the interpolation (using pre-lookup index search) block for use by a debugger tool.

FIG. 9 shows the selection of the block 54 using a debugger tool.

Figure 10:
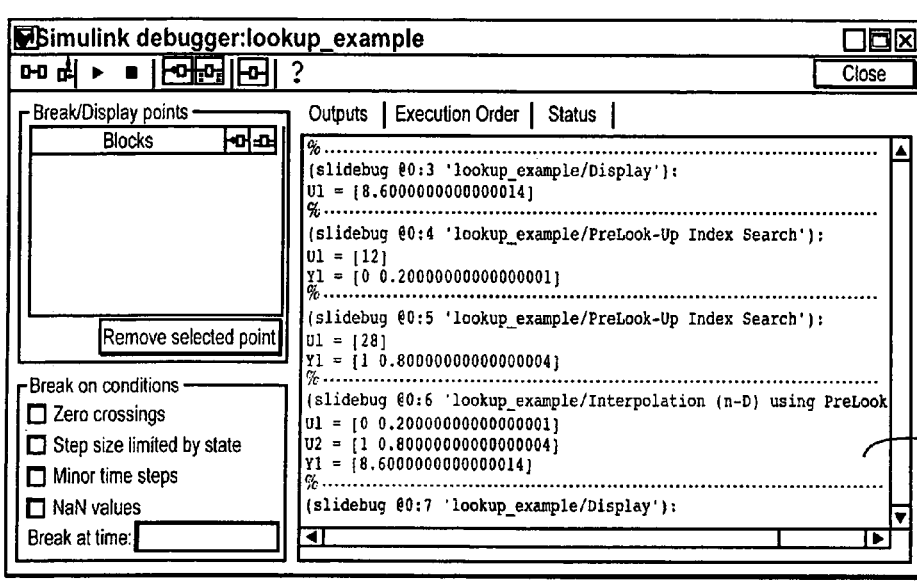
FIG. 10 is an exemplary GUI screen display of the debugger tool results showing the input and output values for the selected interpolation (using pre-lookup index search) block during model execution.

Referring to FIG. 10, the window of the debugger tool 120 displays the input and output values for the selected block (as well as other previously selected blocks) while the model is executing.

Thus, the user determines the table input values, and graphically connects signals from anywhere in the block diagram to N pre-lookup blocks, which in turn are connected to an interpolation block set for N dimensions to perform an n-dimensional interpolation. The user also determines the breakpoint and table data, which the user provides to the model by entering the data in the appropriate dialog boxes. The order in which the blocks are added and connected can vary, as long as the resulting block diagram is functionally the same.

As illustrated in FIG. 6, the prior interpolation lookup requires that the user specify index search parameters, more specifically, breakpoint data, for each interpolation lookup block that uses that data. If several different interpolation lookup blocks (with the same or different table data) use the same breakpoint set(s), a user must specify the breakpoint data for each of those blocks individually. Such an approach is time-consuming and error-prone. As shown in FIGS. 7A-7B, using the two step approach (that is, separate blocks for index search and interpolated lookup), the breakpoint data is specified by the user in a centralized manner, that is, using n pre-lookup index search blocks for n-dimensions, thus ensuring that all interpolation blocks (lookup tables) use the same breakpoint data.

In Simulink®, blocks can be graphically connected using sequences of lines, named goto/from block pairs, mux/demux block pairs, bus creator/bus selector block pairs, subsystem input ports, subsystem output ports, and data store memory blocks. Other block diagram tools may have other graphical connection semantics, but that does not limit how the pre-lookup index search and interpolation (using pre-lookup index search) blocks operate.

In the embodiment described above, and referring back to FIG. 1, the compiler 46 interprets a model for which a two step interpolation has been explicitly specified and drawn (that is, two separate blocks for index search and interpolated lookup are used). As an alternative embodiment to the explicit two step approach described thus far, the model built by the model constructor/editor 42 implements a block diagram that uses prior art interpolation lookup blocks (such as the blocks 20 in FIG. 1B) and the compiler 48 interprets the blocks as if they had been drawn as separate blocks for index search and interpolated lookup by detecting that the blocks 20 share common input values and breakpoint data sets.

That is, the compiler 48 interprets some number "m" of interpolation lookup blocks (such as blocks 20) with common input values and breakpoint data set(s) as being a two step interpolation configuration of blocks, having index search blocks (such as blocks 52, as shown in FIG. 3B), one for each of the shared inputs, connected to and feeding m interpolation blocks (such as blocks 54, also shown in FIG. 3B).

It is to be understood that while the invention has been described in conjunction with the detailed description thereof, the foregoing description is intended to illustrate and not limit the scope of the invention, which is defined by the scope of the appended claims. Other embodiments are within the scope of the following claims.

What is claimed is:

1. A computer-implemented method for splitting table lookup operation into an index search operation and an interpolation operation, the method comprising:
    performing an index search operation using an input value to determine an interval of values in which the input value resides;
    determining the interval of values in which the input value resides, where the determining locates the input value within a range of values;
    in a first block of a block diagram model, calculating a first set of output values using one or more of the interval of values in which the input value resides;
    performing an index search operation using a second input value to determine an interval of values in which the second input value resides;
    determining the interval of values in which the second input value resides, where the determining locates the second input value within a second range of values;
    calculating a second set of output values in a second block of the block diagram model using one or more of the interval of values in which the second input value resides;
    providing the first set of output values or the second set of output values to one or more interpolation blocks in the block diagram model, wherein the one or more interpolation blocks perform an interpolation operation using the first set of output values or the second set of output values; and
    storing one or more output values of the one or more interpolation blocks in a storage device.

2. The method of claim 1, wherein the first block is a pre-lookup index search block associated with a breakpoint data array, wherein the breakpoint data array comprises an ordered list of indexed values of length N.

3. The method of claim 2, wherein the ordered list of values defines a set of regions that includes regions corresponding to a set of N−1 intervals.

4. The method of claim 1, wherein the first set of output values comprises:
    a first interval index indicating the interval in which the input value resides; and
    a first distance fraction indicating normalized distance on the interval indicated by the first interval index.

5. The method of claim 4, further comprising:
    using a linear index search to determine a value of the first interval index, wherein the linear index search comprises:
        checking consecutive N−1 intervals to determine if the input value resides in the interval; and
        setting the value of the first interval index to be equal to value of the interval where the input value resides.

6. The method of claim 1, further comprising:
    performing an index search operation using a second block of the block diagram model to determine an interval of values in which a second input value resides;
    determining the interval of values in which the second input value resides, where the determining locates the second input value within a range of numbers;
    in the second block, calculating a second set of output values using one or more of the interval of values in which the second input value resides; and
    providing the first set of output values or the second set of output values to the one or more interpolation blocks in the block diagram model, wherein the one or more interpolation blocks perform the interpolation operation using the first set of output values or the second set of output values.

7. The method of claim 6, wherein the second block is a pre-lookup index search block associated with a breakpoint data array, wherein the breakpoint data array comprises an ordered list of values of length N.

8. The method of claim 7, wherein the ordered list of values defines a set of regions that includes regions corresponding to a set of N−1 intervals.

9. The method of claim 6, wherein the second set of output values comprises:
    a second interval index indicating the interval in which the second input value resides; and
    a second distance fraction indicating normalized distance on the interval indicated by the second interval index.

10. The method of claim 6, wherein the first block, the second block, or the interpolation blocks reside in a library accessible by one or more users.

11. A non-transitory computer-readable medium holding storing instructions for splitting table lookup operation into an index search operation and an interpolation operation, the medium storing one or more instructions for:
    performing an index search operation using a first input value to determine an interval of values in which the first input value resides;
    determining the interval of values in which the first input value resides, where the determining locates the first input value within a first range of values;
    calculating a first set of output values in a first block of a block diagram model using one or more of the interval of values in which the first input value resides;
    performing an index search operation using a second input value to determine an interval of values in which the second input value resides;
    determining the interval of values in which the second input value resides, where the determining locates the second input value within a second range of values;
    calculating a second set of output values in a second block of the block diagram model using one or more of the interval of values in which the second input value resides;
    providing the first set of output values or the second set of output values to one or more interpolation blocks in the block diagram model, wherein the one or more interpolation blocks perform an interpolation operation using the first set of output values or the second set of output values; and
    storing one or more output values of the one or more interpolation blocks in a storage device.

12. The medium of claim 11, wherein the first set of output values or the second set of output values comprises:
an interval index indicating an interval in which an input value resides; and
a distance fraction indicating normalized distance on the interval indicated by the interval index.

13. The medium of claim 11, wherein the first block and the second block are pre-lookup index search blocks, associated with one or more breakpoint data arrays, wherein the one or more breakpoint data arrays comprise an ordered list of values of length N.

14. The medium of claim 13, wherein the ordered list of values defines a set of regions that includes regions corresponding to a set of N−1 intervals.

15. The medium of claim 11, wherein the first block, the second block and the interpolation blocks reside in a library accessible by one or more users.

16. A computer system comprising a graphical modeling environment for splitting table lookup operation into an index search operation and an interpolation operation, the system comprising:
a processor for:
performing an index search operation using a first input value to determine an interval of values in which the first input value resides,
determining the interval of values in which the first input value resides, where the determining locates the first input value within a first range of values;
calculating a first set of output values in a first pre-lookup index search block of a block diagram model using one or more of the interval of values in which the first input value resides;
performing an index search operation using a second input value to determine an interval of values in which the second input value resides;
determining the interval of values in which the second input value resides, where the determining locates the second input value within a second range of values;
calculating a second set of output values in a second pre-lookup index search block of the block diagram model using one or more of the interval of values in which the second input value resides,
providing the first set of output values and the second set of output values to the one or more interpolation blocks in the block diagram model, wherein the one or more interpolation blocks perform an interpolation operation using the first set of output values and the second set of output values;
a storage for:
storing one or more outputs of the one or more interpolation blocks; and
a display for:
displaying one or more graphical user interfaces (GUIs) for displaying the first pre-lookup index search block, the second pre-lookup index search block or at least one of the one or more interpolation blocks to a user.

17. The system of claim 16, wherein the one of the one or more GUIs displays the pre-lookup index search block, the system further comprising:
one or more input peripherals, the one of the one or more GUIs interacting with the one or more input peripherals for:
specifying a breakpoint data array for the first pre-lookup index search block or the second pre-lookup index search block;
specifying an index search algorithm; or
specifying an extrapolation method.

18. The system of claim 16, wherein the one of the one or more GUIs displays the interpolation block, the system further comprising:
one or more input peripherals, the one of the one or more GUIs interacting with the one or more input peripherals for:
specifying a number of table dimensions;
specifying entries for a table data;
specifying an interpolation method; or
specifying an extrapolation method.

19. The system of claim 16, further comprising:
a compiler for interpreting the block diagram model when a two-step interpolation technique is specified by the user.

* * * * *